Patented Aug. 28, 1934

1,972,036

UNITED STATES PATENT OFFICE 1,972,036

1-PHENYL-2,3-DIMETHYL-4-ALKYL-5-PYRAZOLONES

Hans Stenzl, Basel, Switzerland, assignor to Hoffmann-La Roche Inc., Nutley, N. J., a corporation of New Jersey No Drawing. Application September 15, 1932, Serial No. 633,377. In Germany October 9, 1931

2 Claims. (Cl. 260—45)

Of the alkyl homologues of 1-phenyl-2,3-dimethyl-5-pyrazolone the 1-tolyl-2,3-dimethyl-pyrazolone and the 1-phenyl-2-ethyl-3-methyl-pyrazolone are already known. Both these compounds are but very slightly superior in action to 1-phenyl-2,3-dimethyl-5-pyrazolone. A further possibility of obtaining homologues lies in alkylating the 4-position. Of the derivatives thus obtainable an action superior to that of the non-methylated compound in 4-position is ascribed to the 4-methyl-compound, but evidently this action is not particularly strong. None of these compounds has attained any practical value. It was therefore surprising to find that by the introduction of alkyl radicals, consisting of a chain of 3 carbon atoms, into the 4-position compounds may be obtained, which in action are far superior to 1-phenyl-2,3-dimethyl-4-dimethyl-amino-5-pyrazolone, their action being 6 to 8 times as strong as the action of 1-phenyl-2,3-dimethyl-5-pyrazolone. They are well crystallized, in water difficultly, in most organic solvents easily soluble compounds, which are obtained in the usual manner by methylating the corresponding 4-alkyl-pyrazolones.

To this group, characterized by a side-chain comprising three carbon atoms, there also belong the derivatives with unsaturated side-chain. Kobert (Zeitschrift für Klinische Medizin, 62, 1907, page 98) describes the action of a compound he calls 4-allyl-antipyrine, without giving any indications of its preparation, melting point and analysis. The compound is easily soluble in water, is used in slightly warmed solution, its solubility is heightened by the addition of soda. The product dyes a mixture of potassium-ferri-cyanide and ferric chloride blue. The 4-allyl-compound obtained according to Example 3 shows none of these properties. Its constitution has been well defined by analysis and by its convertibility into the 4-n-propyl-compound by catalytic hydrogenation. The compound described by Kobert consequently was not 4-allyl-1-phenyl-2,3-dimethyl-pyrazolone.

The new compounds are to be used as medicines.

Example 1

475 parts of 1-phenyl-3-methyl-4-isopropyl-pyrazolone are well mixed with 305 parts of dimethyl-sulphate and slowly heated to 125° C. After 3 hours 1600 parts of 3-n-solution of sodium hydroxide are added and the reaction product boiled for 30 minutes longer. The mixture is then poured into water while stirring, whereby the 1-phenyl-2, 3 dimethyl-4-isopropyl-pyrazolone congeals. It is re-crystallized from petroleum ether and obtained in colourless crystals melting at 103° C.

Example 2

475 parts of n-propyl-pyrazolone are well mixed with 305 parts of dimethyl-sulphate and slowly heated to 125° C. After three hours 1600 parts of 3-n-solution of sodium hydroxide are added and the reaction product boiled for 30 minutes longer. The mixture is then poured into water while stirring, whereby the 1-phenyl-2,3 dimethyl-4-n-propylpyrazolone congeals. It is re-crystallized from a mixture of petroleum ether with a small quantity of ether while thoroughly cooling and obtained in soft feathery crystals melting at 57° C.

Example 3

10 parts of 1-phenyl-3-methyl-4-allyl-pyrazolone are heated with a mixture of 25 parts of methyl-alcohol and 6 parts of methyl-bromide for 9 to 10 hours to 100° C. under pressure. After evaporating the solvent a solution of sodium hydroxide is added in excess and that part of the mixture, which is insoluble in alkali, removed with ether. After drying and evaporating the ether, the 1-phenyl-2,3-dimethyl-4-allyl-pyrazolone remains; it is re-crystallized from petroleum ether and obtained in colourless crystals melting at 52–53° C. It is soluble to the extent of 3.9% in water at normal temperature; the solubility in water is greatly reduced by the addition of sodium-carbonate or by warming to blood-temperature. A mixture of potassium-ferri-cyanide and ferric chloride is not dyed blue with the alcohol solution.

By catalytic hydrogenation the 1-phenyl-2,3-dimethyl-4-allyl-pyrazolone is converted into the 1-phenyl-2,3-dimethyl-4-propyl-pyrazolene.

I claim:

1. The 1-phenyl-2,3-dimethyl-4-isopropyl-pyrazolone, crystallizing in colourless needles melting at 103° C., the new compounds being difficultly soluble in water and reacting neutrally on litmus paper, easily soluble in dilute mineral acids and in most organic solvents, insoluble in alkali.

2. 1-phenyl-2,3 - dimethyl - 4 - R - pyrazolene, where R represents an alkyl radical containing three carbon atoms.

HANS STENZL.